United States Patent
Goss et al.

(10) Patent No.: US 10,048,863 B1
(45) Date of Patent: Aug. 14, 2018

(54) OPEN BLOCK REFRESH MANAGEMENT

(71) Applicant: Seagate Technology LLC, Cupertino, CA (US)

(72) Inventors: Ryan James Goss, Prior Lake, MN (US); Antoine Khoueir, Edina, MN (US); Ara Patapoutian, Hopkinton, MA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/170,874

(22) Filed: Jun. 1, 2016

(51) Int. Cl.
*G11C 7/00* (2006.01)
*G06F 3/06* (2006.01)

(52) U.S. Cl.
CPC ............ *G06F 3/0604* (2013.01); *G06F 3/064* (2013.01); *G06F 3/0653* (2013.01); *G06F 3/0659* (2013.01); *G06F 3/0665* (2013.01); *G06F 3/0679* (2013.01)

(58) Field of Classification Search
CPC ......... G11C 5/005; G11C 29/00; G11C 29/42; G06F 11/00
USPC .................................... 365/200, 201, 185.03
See application file for complete search history.

(56) References Cited

U.S. PATENT DOCUMENTS

| | | | |
|---|---|---|---|
| 8,510,595 B2 | 8/2013 | Walls et al. | |
| 8,526,245 B2 | 9/2013 | Yoon et al. | |
| 8,909,986 B2 | 12/2014 | Huang et al. | |
| 8,914,670 B2 | 12/2014 | Zaltsman et al. | |
| 9,032,271 B2 | 5/2015 | Sun et al. | |
| 9,570,177 B2 * | 2/2017 | Choi | G11C 16/10 |
| 2012/0117304 A1 * | 5/2012 | Worthington | G06F 12/0223 711/103 |
| 2013/0054880 A1 | 2/2013 | Chang et al. | |
| 2015/0100851 A1 | 4/2015 | Bhalerao et al. | |
| 2016/0019142 A1 * | 1/2016 | Lin | G06F 12/0246 711/103 |
| 2016/0110114 A1 * | 4/2016 | Moon | G06F 12/0246 711/103 |
| 2016/0110249 A1 * | 4/2016 | Orme | G06F 3/0619 714/6.24 |

* cited by examiner

*Primary Examiner* — Han Yang
(74) *Attorney, Agent, or Firm* — Cesari & Reed, LLP; Kirk A. Cesari; Christian W. Best

(57) ABSTRACT

Systems and methods are disclosed for open block refresh management. In certain embodiments, an apparatus may comprise a circuit configured to monitor an amount of time a block of a solid-state memory remains in an open state where the block has not been fully filled with data, and in response to reaching an open block time limit, compare an amount of the block already written with data against a threshold amount. When less than a threshold amount of the block has been written with data, the circuit may refresh data from a last N pages from the block by writing the data to a new location, N being a number of pages less than all pages in the block. When more than the threshold amount of the block has been written with data, the circuit may fill a remaining unwritten amount of the block with dummy data.

19 Claims, 4 Drawing Sheets

OPEN BLOCK REFRESH MANAGEMENT

SUMMARY

In certain embodiments, an apparatus may comprise a circuit configured to monitor an amount of time a block of a solid-state memory remains in an open state where the block has not been fully filled with data, and, in response to reaching an open block time limit, refresh data from a last N pages from the block by writing the data to a new location, N being a number of pages less than all pages in the block.

In certain embodiments, a method may comprise monitoring an amount of time a block of a solid-state memory remains in an open state where the block has not been fully filled with data, and, in response to reaching an open block time limit, refreshing data from a last N pages from the block by writing the data to a new location, N being a number of pages less than all pages in the block.

In certain embodiments, an apparatus may comprise a circuit configured to monitor an amount of time a block of a solid-state memory remains in an open state where the block has not been fully filled with data, and in response to reaching an open block time limit, compare an amount of the block already written with data against a threshold amount. When less than a threshold amount of the block has been written with data, the circuit may refresh data from a last N pages from the block by writing the data to a new location, N being a number of pages less than all pages in the block. When more than the threshold amount of the block has been written with data, the circuit may fill a remaining unwritten amount of the block with dummy data.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Further, the methods described herein may be implemented as a computer readable storage medium or memory device including instructions that, when executed, cause a processor to perform the methods.

Figure 1:
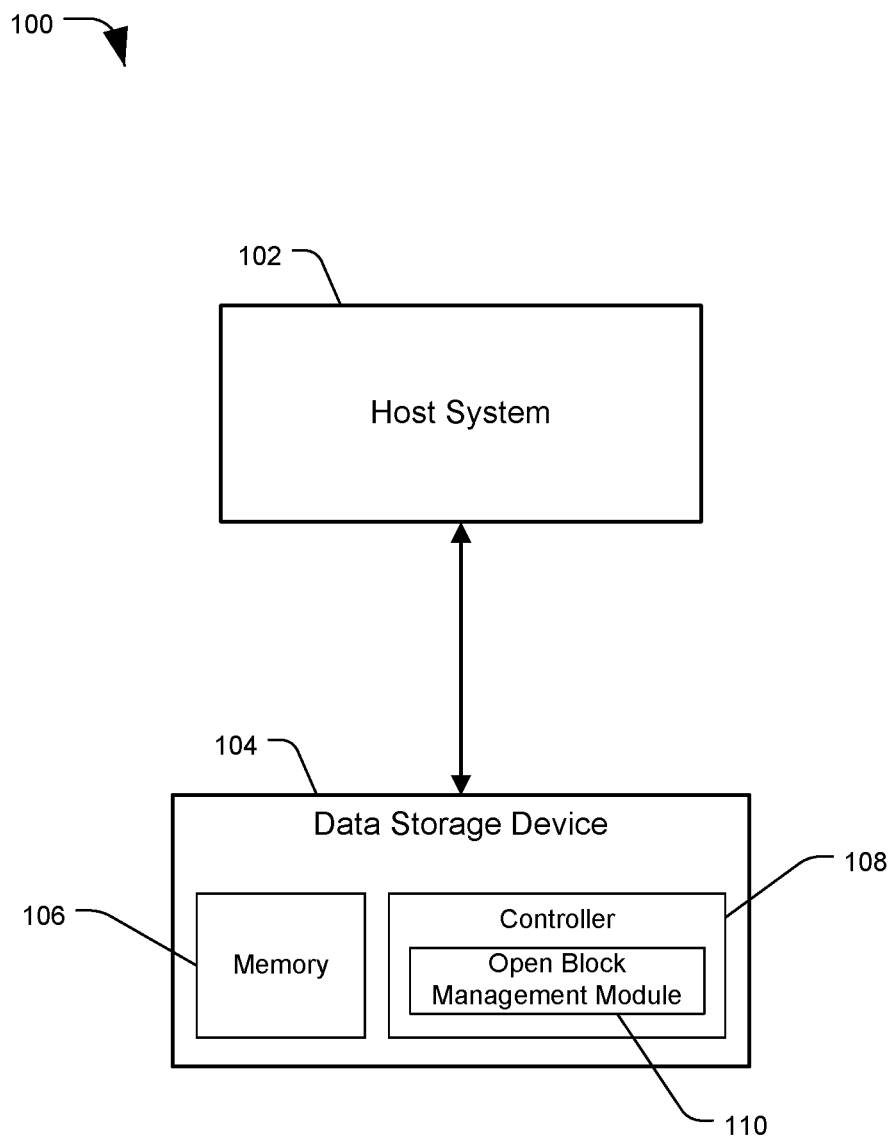
FIG. 1 is a diagram of a system configured to perform open block refresh management, in accordance with certain embodiments of the present disclosure.

FIG. 1 is a diagram of a system configured to perform open block refresh management, generally designated 100, in accordance with certain embodiments of the present disclosure. The system 100 may include a host 102 and a data storage device (DSD) 104. The host 102 may also be referred to as the host system or host computer. The host 102 can be a desktop computer, a laptop computer, a server, a tablet computer, a telephone, a music player, another electronic device, or any combination thereof. Similarly, the DSD 104 may be any of the above-listed devices, or any other device which may be used to store or retrieve data, such as a solid state drive (SSD). The host 102 and DSD 104 may be connected by way of a wired or wireless connection, or by a local area network (LAN) or wide area network (WAN). In some embodiments, the DSD 104 can be a stand-alone device not connected to a host 102 (e.g. a removable data storage device having its own case or housing), or the host 102 and DSD 104 may both be part of a single unit (e.g. a computer having an internal hard drive).

The DSD 104 may include a memory 106 and a controller 108. The DSD 104 may receive a data access request, such as a read or write request, from the host device 102. In response, the DSD 104 may use the controller 108 to perform data access operations on the memory 106 based on the request. The controller 108 may comprise a circuit or processor configured to control operations of the data storage device 104, such as the methods and functions described herein, as well as storing data to or retrieving data from the memory 106. The memory 106 may comprise one or more data storage mediums, such as nonvolatile solid state memories such as Flash memory, magnetic storage media such as disc drives, other types of memory, or a combination thereof.

Some memories 106, such as NAND Flash memory, may include a plurality of storage locations referred to as "blocks," and each block may include a plurality of smaller storage locations referred to as "pages." The pages may correspond to programmable word lines of the solid state memory array. Some solid state memories are not randomly writable in that data cannot be overwritten or updated in-place, and instead the storage locations must be erased or reset prior to being written with new data. Data may be written (or "programmed") at the page level, but the erasing process may be limited to the block level.

Blocks in a memory may be written a page at a time, for example by starting at a first page and continuing one page at a time until all pages have been written. When some data has been written to a block but not all pages of the block have been filled, the block may be considered to be in an "open" state. Similarly, one or more most-recently written pages of a block may be considered "open" pages. If left in an open state for a prolonged period of time, data in an open block may have a chance of developing errors and becoming less reliable. In order to avoid loss of data, the DSD 104 may be configured to perform open block management operations.

DSD 104 may include an open block management module (OBMM) 110. A "module" may include one or more physical components of a computing device (e.g., circuits, processors, etc.), may include instructions that, when executed, can cause a processor to perform a particular task or job, or any combination thereof. A module may be configured to perform a particular task or job. The OBMM 110 may perform the methods and processes described herein to monitor open blocks and perform operations to prevent data loss at open blocks. A more detailed example embodiment of a DSD 104 is described in regards to FIG. 2.

Figure 2:
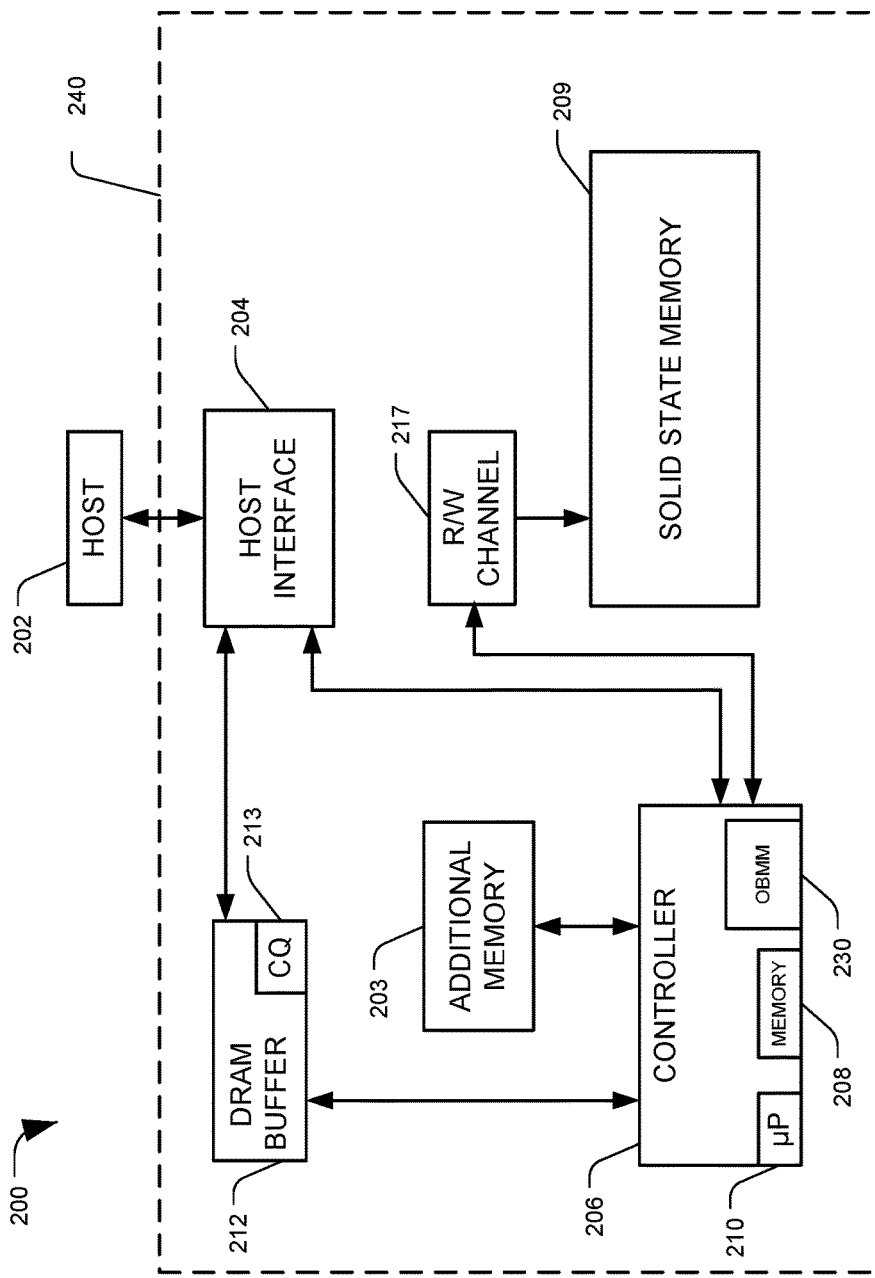
FIG. 2 is a diagram of a system configured to perform open block refresh management, in accordance with certain embodiments of the present disclosure.

FIG. 2 is a diagram of a system 200 configured to perform open block refresh management, in accordance with certain embodiments of the present disclosure. Specifically, FIG. 2 provides a functional block diagram of an example data storage device (DSD) 200. The DSD 200 can communicate with a host device 202 (such as the host system 102 shown in FIG. 1) via a hardware or firmware-based interface circuit 204. The interface 204 may comprise any interface that allows communication between a host 202 and a DSD 200, either wired or wireless, such as USB, IEEE 1394, Compact Flash, SATA, eSATA, PATA, SCSI, SAS, PCIe, Fibre Channel, Ethernet, or Thunderbolt, among others. The interface 204 may include a connector (not shown) that allows the DSD 200 to be physically removed from the host 202. In some embodiments, the DSD 200 may have a casing 240 or housing containing the components of the DSD 200, or the components of the DSD 200 may be attached to the housing, or a combination thereof. The DSD 200 may communicate with the host 202 through the interface 204 over wired or wireless communication.

The buffer 212 can temporarily store data during read and write operations, and can include a command queue (CQ) 213 where multiple pending operations can be temporarily stored pending execution. Commands arriving over the interface 204 may automatically be received in the CQ 213 or may be stored there by controller 206, interface 204, or another component.

The DSD 200 can include a programmable controller 206, which can include associated memory 208 and processor 210. In some embodiments, the DSD 200 can include a read-write (R/W) channel 217, which can encode data during write operations and reconstruct user data retrieved from a memory, such as solid state memory 209, during read operations. Solid state memory 209 may include nonvolatile memory, such as NAND Flash memory.

In some embodiments, the DSD 200 may include an additional memory 203 instead of or in addition to solid state memory 209. For example, additional memory 203 can be either volatile memory such as DRAM or SRAM, nonvolatile memory such as magnetic disc(s) or additional nonvolatile solid state memory, or any combination thereof. The additional memory 203 can function as a cache and store recently or frequently read or written data, or data likely to be read soon. Additional memory 203 may also function as main storage instead of or in addition to solid state memory 209. A DSD 200 containing multiple types of nonvolatile storage mediums, such as a disc and Flash, may be referred to as a hybrid storage device.

DSD 200 may include an open block management module (OBMM) 230. The OBMM 110 may perform the methods and processes described herein to monitor open blocks and perform operations to prevent data loss at open blocks. For example, the OBMM 230 may monitor open blocks at solid state memory 209, perform evaluations of the blocks, and then perform reliability enhancing actions to prevent data loss. The OBMM 230 may be part of or execute by the controller 206, may be a separate component or circuit, may be incorporated into other components of the DSD 200, or any combination thereof. Additional details on the solid state memory 209 and OBMM 230 are discussed in regard to FIG. 3.

Figure 3:
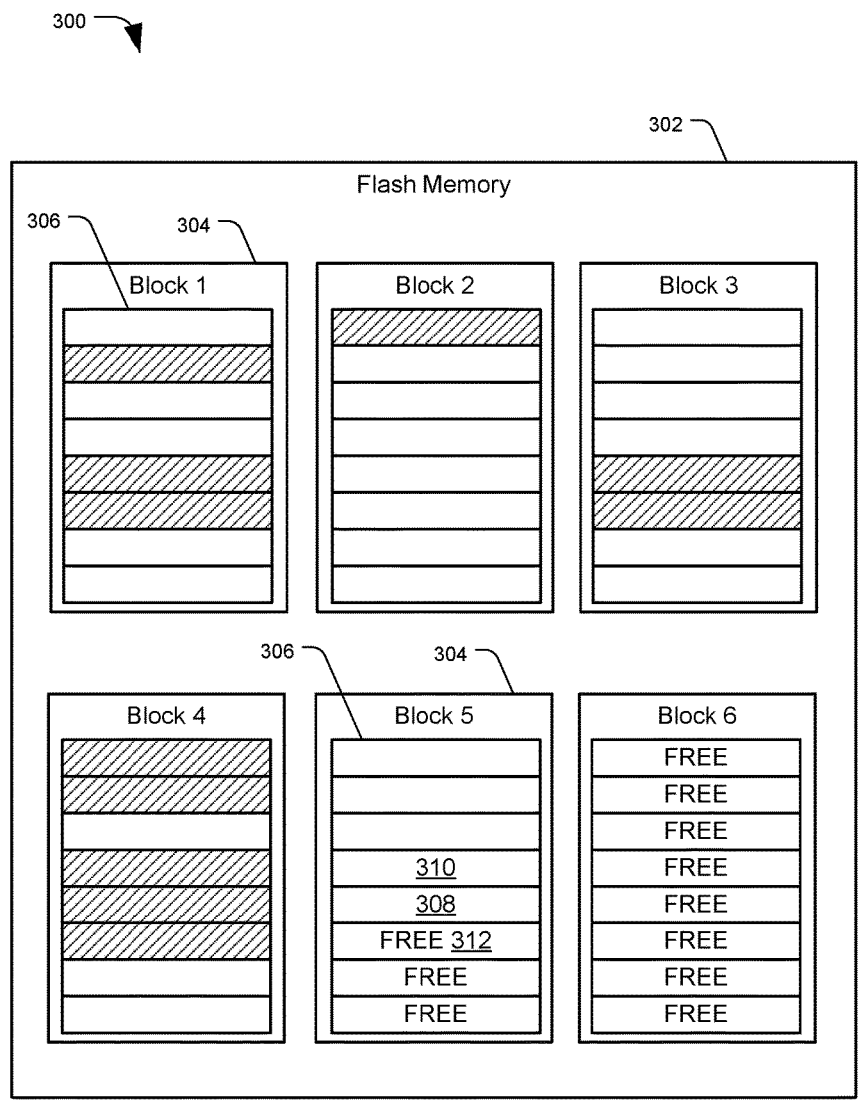
FIG. 3 is a diagram of a system configured to perform open block refresh management, in accordance with certain embodiments of the present disclosure.

FIG. 3 is a diagram of a system 300 configured to perform open block refresh management, in accordance with certain embodiments of the present disclosure. System 300 may include a NAND Flash memory 302, although other types of solid state memory are also possible. Flash memory 302 may include a plurality of blocks 304, each of which may include a plurality of writable pages 306 for storing data. Data may be written to Flash memory 302 in page-sized data segments. For example, each page 306 may store 8 KiB (kibibyte) of data, and a block 304 may contain 64 pages, or 128 pages.

A portion of each page may be devoted to error correction code (ECC) checksum values or other error correction or parity data. The size of pages and blocks, and the number of pages per block may be different depending on the device. Pages containing invalid data (e.g. no longer valid due to a more recent copy of the data being stored elsewhere) are indicated in FIG. 3 by hashed lines. Pages that have not yet been written are indicated as "free."

As stated, data may be written to Flash memory 302 one page 306 at a time, but already written data may not be overwritten with new data. If data stored in a specific page 306 is updated (e.g. a newer version is written to a new location), the data for that page becomes invalid. Once all the pages 306 in a block 304 have been filled with valid or invalid data, a garbage collection process may be performed to recapture that space and allow new data to be written to the block 304. In garbage collection, all valid data is read from a block 304 and written to new pages 306 in other blocks 304. Once all valid data has been removed from a block 304, the entire block 304 may be erased and made available for new data. Data may be written one page at a time, but only an entire block may be erased at a time.

For example, Block 4 may be selected for garbage collection, because it has the most invalid pages. The three valid pages may be read, and may be copied to the three free pages of Block 5. Block 4 may therefore no longer have any valid data, and all pages 306 in Block 4 may be erased and made free for new data.

When only a portion of the pages 306 of a block 304 have been written, as shown in Block 5, that block may be considered to be in an open state. Once all pages 306 of a block 304 have been written with data (whether valid or invalid), the block 306 may be put in a closed state, as in Block 1 through Block 4. Closing a block 306 may include refining and stabilizing threshold voltage values. When a block has not been closed, coupling effects between written pages and unwritten free pages may result in a degradation of data quality in pages of the open block. Remaining in an open state for a prolonged period may lead to data corruption and errors in the stored data, and eventually may lead to unrecoverable data.

As used herein, an open page may be a last-written page in an open block. Similarly, reference may be made to open word lines, with word lines and bit lines being used to store data to certain solid state memories. As used herein, discussion of open pages may be applied to open word lines as well. As an example of an open page, page 308 may be the last-written page of Block 5, and adjacent to a first free page 312. Open pages 308 and other pages 310 close to free pages may be most susceptible to data errors from being in an open block. For example, the closer a page 306 is to an unwritten free page 312, the more likely the page 306 is to experience data quality degradation.

In order to prevent data degradation or loss at open blocks 306 and pages 308, an open block management module (OBMM) may perform operations to monitor and manage open blocks and pages. The OBMM may be configured to monitor an amount of time blocks remain in an open state, performing data maintenance of data in open blocks, and other operations as disclosed herein. An example method of performing open block refresh management operations is described in regard to FIG. 4.

Figure 4:
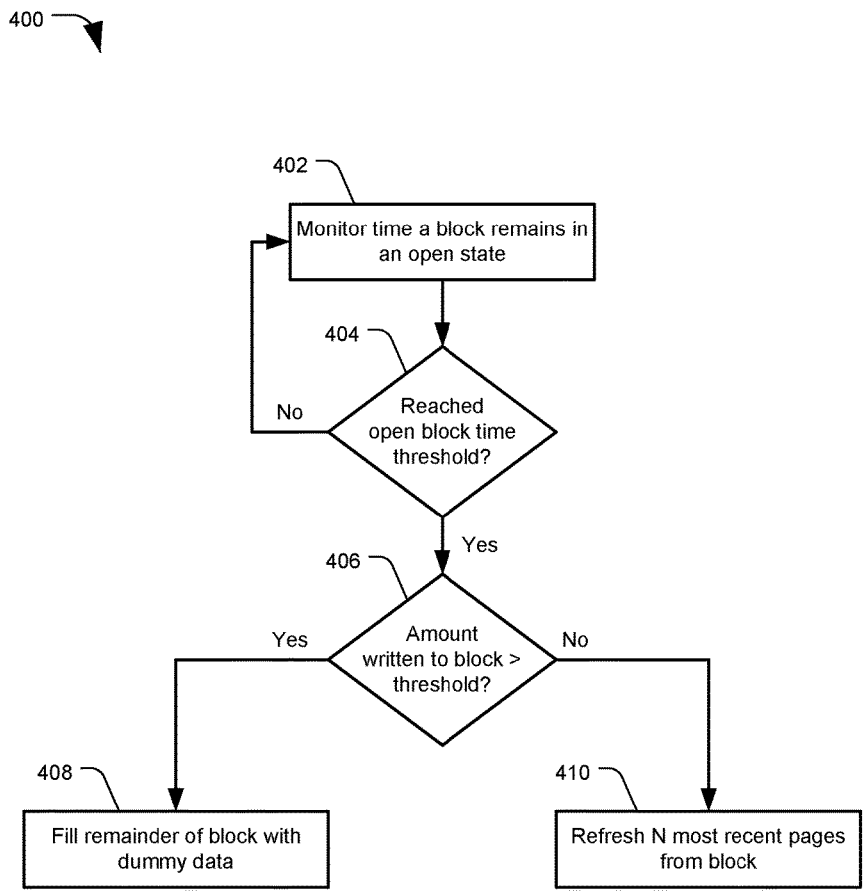
FIG. 4 is a flowchart of a method of open block refresh management, in accordance with certain embodiments of the present disclosure.

FIG. 4 is a flowchart of an example method 400 of open block refresh management, in accordance with certain embodiments of the present disclosure. The method 400 may be performed by an open block management module (OBMM) as described herein.

Method 400 may include monitoring an amount of time a selected block remains in an open state, at 402. Data stored to blocks may remain reliable for a certain period of time while the block is in an open state. In order to mitigate data loss due to open blocks, the OBMM may compare an amount of time that a block has been in an open state against an open block timeout period, or open block time threshold. The open block time threshold may indicate a time period within which data is expected to remain reliable in an open block state, and after which errors are more likely to arise. The open block time threshold may be an amount of time a block is allowed to remain in an open state before action is taken to prevent data loss. The time threshold may be set by a manufacturer of a data storage device (DSD) or by the OBMM, for example based on reliability testing performed on similar memories. The time threshold may also be set by a user or in other ways. The time threshold may be varied by the OBMM, for example based on a measured temperature, device or block wear, or other conditions.

The method 400 may include determining whether the open block time threshold has been reached for the selected block, at 404. If not, the method 400 may include continuing to monitor the time that the selected block remains in an open state, at 402.

When the selected block has reached the open block time threshold, at 404, the OBMM may perform operations to prevent data loss and enhance reliability. The operations the OBMM performs may depend an amount of data currently written to the selected block, a percentage of the selected block's capacity that is full or available, or similar storage metrics. For example, each block may include 64 pages which may be used for storing data, and what data loss prevention operations the OBMM performs may depend on how many of the 64 pages have been programmed with data. Accordingly, the method 400 may include determining whether an amount of data written to the selected block is higher than a threshold value, at 406.

When the amount of data written to the block is greater than the threshold, the method 400 may include filling the remainder of the block with dummy data, at 408. For example, the OBMM may initiate a program operation to store a predetermined or random data pattern to any remaining free pages of the selected block, and then close the block. Writing dummy data allows the OBMM to close the selected block without waiting for additional user or host data to record to the block. By filling and closing the block, the data degradation due to remaining in an open state is eliminated.

When the amount of data written to the selected block is not greater than the threshold value, at 406, the method 400 may include refreshing up to a number of pages "N" from the selected block that were most recently written. N may be an integer number that corresponds to a number of pages that may be most susceptible to data degradation due to the block remaining in an open state, and may be fewer than the total number of pages in a block. For example, a block may have 64 total pages of capacity, and "N" may be 8, so that up to 8 pages are refreshed when the open block time threshold is reached and less than a threshold amount of data is written to the block. The most-recently written pages may be selected because those are the pages most likely to have developed data errors while in an open state, and refreshing the data may allow for correcting the errors. Pages written longer ago than the N most recent pages may not be as likely to develop errors, and not refreshing those pages may reduce the time to perform the refresh.

Refreshing the data from the N pages in the selected block may include reading data from the selected block, correcting any data errors that have been detected, and copying the data to a new location. The data may be programmed to a new block, or back into free pages of the selected block. The newly written data will not include any degradation yet, and if the target block is still open, a new open block time threshold may be monitored for the data. In this manner, the data that was read from the N pages of the selected block during the refresh becomes invalid data, because a newer version of the data is recorded elsewhere. Loss of the invalid data is no longer a concern for those N pages.

The data refresh may be modified based on the circumstances and the content of the N most recent pages. If an open block time threshold is reached with less than N pages written to the selected block, all of the written pages may be refreshed even though the number is less than N. Some of the N most recently written pages may include invalid data, for example if data corresponding to the same LBAs was updated and written to another location. The OBMM may be configured to only refresh the valid data from the N most recent pages, which may include refreshing less than N pages of data. The OBMM may optionally be configured to refresh the N most recent valid pages from the block, which may include skipping pages with invalid data and refreshing pages from farther back than the N most recently written pages.

The threshold applied at 406, which determines whether dummy data is written or data is refreshed, may be based on which operation requires less time or operational overhead. For example, performing a refresh may include reading N pages of data, correcting errors in the data, and writing N pages of data back to the solid state memory. Conversely, writing dummy data may only require writing data to the remaining open pages of the block, without reading data or error correction operations. Accordingly, writing N pages of dummy data may be a faster operation than refreshing N pages of data. So as an example, a threshold may be selected so that dummy data is written if there are N pages or less of free pages remaining in the block, and a refresh may be performed when there are N or more free pages remaining in the selected block. The capacity threshold may be stored to a memory of the DSD by a manufacturer, for example based on factory testing to determine a threshold that results in a most efficient device performance. The capacity threshold may be set or adjusted by the OBMM. For example, if the number of pages that would be refreshed can vary, such as based on a number of pages having valid data in the N most recently written pages, which operation between refreshing and writing dummy data can change. The OBMM may set the threshold based on a number of pages that would be refreshed in a refresh operation. For example, the OBMM may determine that writing dummy data would be more efficient if the number of free pages in the selected block is less than the number of pages that would be refreshed. The OBMM may be configured to compute or estimate a completion time to write dummy data and a completion time to perform a data refresh, and may select the fastest operation. For example, the OBMM may have access to a look-up table that may provide a completion time based on a number of pages to be refreshed or dummy data to be written. Other embodiments are also possible.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a solid-state memory having blocks to which data is stored, each block divided into a plurality of pages;
   a circuit configured to:
      monitor an amount of time a block of the solid-state memory remains in an open state where the block has not been fully filled with data;
      in response to reaching an open block time limit, refresh data from a last N pages from the block, N being a number of pages less than all pages in the block, including:
         reading the data from the last N pages; and
         writing the data to a new location.

2. The apparatus of claim 1 comprising the circuit further configured to:
   refresh the data from the last N pages when less than a threshold amount of the block has been written with data; and
   fill a remaining unwritten amount of the block with dummy data when more than the threshold amount of the block has been written with data.

3. The apparatus of claim 2 further comprising the number of pages N is based on a set of most-recently written pages most affected by data degradation from the open state.

4. The apparatus of claim 3 comprising the circuit further configured to refresh data from the last N pages of the block that contain valid data.

5. The apparatus of claim 3 comprising the circuit further configured to refresh data from only those pages of the last N pages of the block which include valid data.

6. The apparatus of claim 5 further comprising the threshold amount delineates whether refreshing the data is faster than writing dummy data.

7. The apparatus of claim 6 comprising the circuit further configured to set the threshold amount based on a number of pages that would be refreshed in a refresh operation.

8. A method comprising:
   monitoring an amount of time a block of a solid-state memory remains in an open state where the block has not been fully filled with data; and
   in response to reaching an open block time limit, refreshing data from a last N pages from the block by writing the data to a new location, the number of pages N being a number of pages less than all pages in the block and based on a set of most-recently written pages most affected by data degradation from the open state.

9. The method of claim 8 further comprising:
   writing the last N pages to the new location when less than a threshold amount of the block has been written with data; and
   filling a remaining unwritten amount of the block with dummy data when more than the threshold amount of the block has been written with data.

10. The method of claim 9 further comprising the threshold amount delineates whether refreshing the data is a faster operation than writing dummy data.

11. The method of claim 9 further comprising setting the threshold amount based on a number of pages that would be refreshed in a refresh operation.

12. The method of claim 8 further comprising refreshing data from only those pages of the last N pages of the block which include valid data.

13. The method of claim 8 further comprising refreshing data from the last N pages of the block that contain valid data.

14. An apparatus comprising:
   a circuit configured to:
      monitor an amount of time a block of a solid-state memory remains in an open state where the block has not been fully filled with data;
      in response to reaching an open block time limit, compare an amount of the block already written with data against a threshold amount;
      when less than the threshold amount of the block has been written with data, refresh data from a last N pages from the block by writing the data to a new location, N being a number of pages less than all pages in the block; and
      when more than the threshold amount of the block has been written with data, fill a remaining unwritten amount of the block with dummy data.

15. The apparatus of claim 14 further comprising the number of pages N is based on a set of pages from the block that are most affected by data degradation from the open state.

16. The apparatus of claim 14 comprising the circuit further configured to refresh data from only those pages of the last N pages of the block which include valid data.

17. The apparatus of claim 14 comprising the circuit further configured to refresh data from the last N pages containing valid data, and not refreshing pages having invalid data.

18. The apparatus of claim 14 further comprising the threshold amount delineates whether refreshing the data is faster than writing dummy data.

19. The apparatus of claim 14 comprising the circuit further configured to set the threshold amount based on a number of pages that would be refreshed in a refresh operation.

* * * * *